United States Patent [19]
McGrew

[11] 4,411,489
[45] * Oct. 25, 1983

[54] SYSTEM FOR SYNTHESIZING STRIP-MULTIPLEXED HOLOGRAMS

[76] Inventor: Steve P. McGrew, Postbus 1860, Amsterdam, Netherlands

[*] Notice: The portion of the term of this patent subsequent to Jun. 10, 1997, has been disclaimed.

[21] Appl. No.: 126,343

[22] Filed: Mar. 3, 1980

Related U.S. Application Data

[63] Continuation of Ser. No. 716,463, Aug. 23, 1976, Pat. No. 4,206,965.

[51] Int. Cl.³ .............................................. G03H 1/26
[52] U.S. Cl. .................... 350/3.76; 350/3.69
[58] Field of Search .................... 350/3.76, 3.66, 3.75, 350/3.77, 3.78, 3.79, 3.84, 173, 3.67, 3.69

[56] References Cited
U.S. PATENT DOCUMENTS
4,339,168 7/1982 Haines ................................ 350/3.76

*Primary Examiner*—Bruce Y. Arnold
*Attorney, Agent, or Firm*—Seed and Berry

[57] ABSTRACT

A system for synthesizing strip-multiplexed holograms, with or without coherent light, from a plurality of two-dimensional images. The two-dimensional images may be formed by a motion picture film of a rotating subject such that each image is a view of the subject from a different angle. The images are then non-diffusely and anamorphically projected by a lens system which compresses the image in a first direction and expands the image in a second direction orthogonal to the first direction. The projected image or object beam is then superimposed on the reference beam by a lens-beamsplitter which transforms the substantially planar object beam into a substantially cylindrical wavefront and projects it and the reference beam onto a holographic recording medium. As each two-dimensional image is sequentially projected, the holographic recording medium is shifted so that a plurality of laterally displaced strips are recorded. Alternate embodiments of the system utilize a holographic diffraction grating which is contact printed by means of the object beam onto the holographic recording medium instead of a reference beam to produce an interference pattern, a video projection system instead of a cinema film projection system, a three-color image of coherent or nondiffuse light instead of a monochromatic image, and/or three separate holographic diffraction gratings produced by three different monochromatic sources of coherent light instead of a single holographic diffraction grating in order to produce multicolor holograms, or a reference beam or reflective surface relief diffraction grating or Fresnel mirror behind the holographic recording medium for synthesis of reflection holograms instead of transmission holograms. The system is capable of synthesizing image plane holograms by using a variety of disclosed processes. Techniques are also disclosed for synthesizing holograms which can be displayed flat and illuminated with a point light source without introducing image distortion.

60 Claims, 31 Drawing Figures

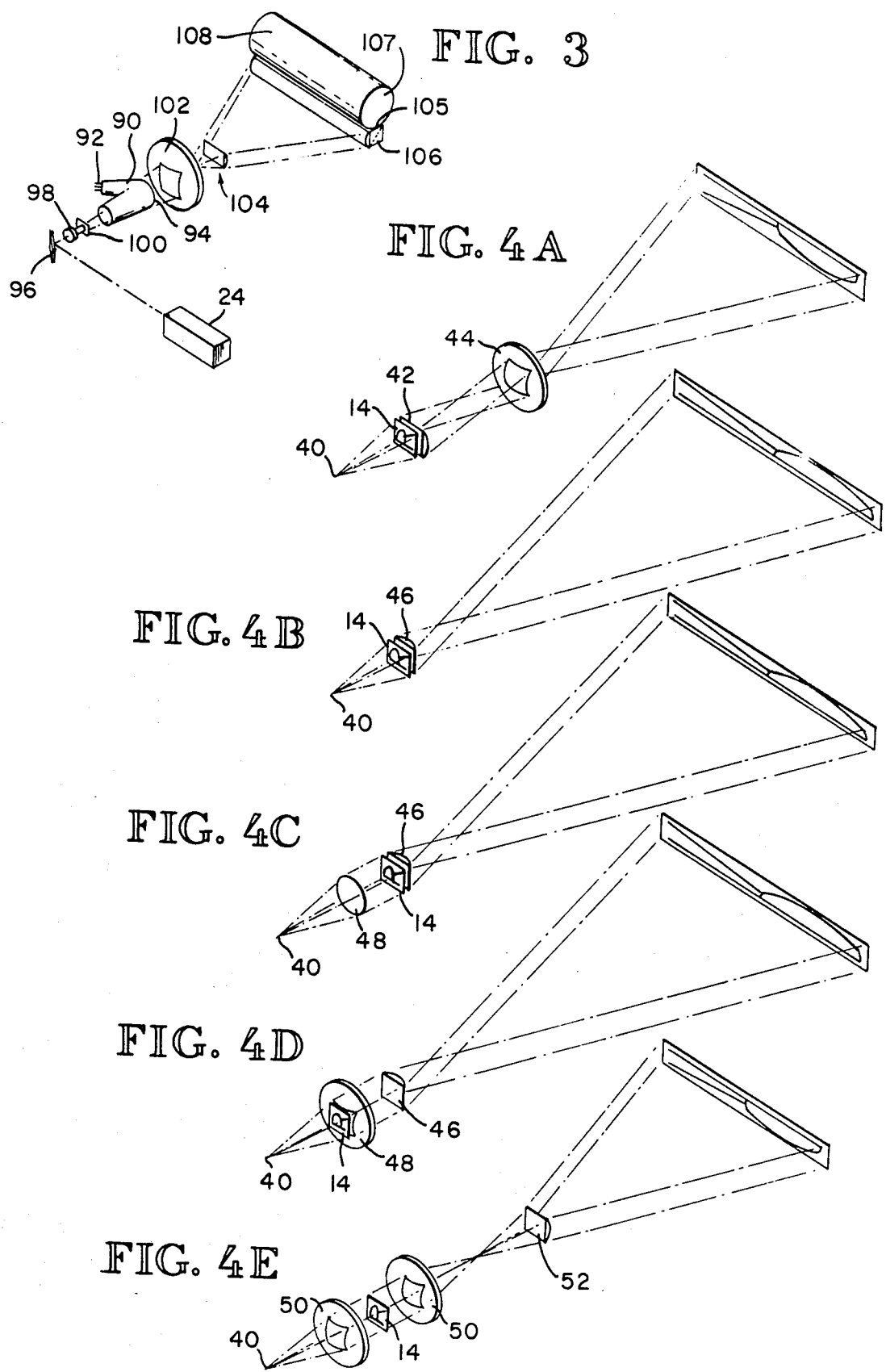

SYSTEM FOR SYNTHESIZING STRIP-MULTIPLEXED HOLOGRAMS

This is a continuation of application Ser. No. 716,463, filed Aug. 23, 1976 now U.S. Pat. No. 4,206,965.

BACKGROUND OF THE INVENTION

1. Field of the Invention

This invention relates to holography and, more particularly, to a system for generating strip-multiplexed transmission or reflection holograms.

2. Description of the Prior Art

Strip-multiplexed holograms are formed by a plurality of narrow, holographic images recorded on holographic recording medium in a plurality of laterally displaced, adjacent strips. Many of the techniques for making strip-multiplexed holograms have been developed by the Multiplex Company of San Francisco. In their system, an ordinary black and white motion picture film is made of a slowly rotating subject such that the film frames contain views of the subject taken from all angles around the subject. The cinema film is projected by a projector having a laser light source through a large spherical lens and a large cylindrical lens placed directly beyond the spherical lens. The large lenses bring the image to a line focus near the surface of a sheet of holographic recording medium mounted in a film transport. A fan-shaped reference beam, originating at a point directly above the cylindrical lens, is projected onto the holographic recording medium so that the reference beam is superimposed upon the line focus of the image or object beam. The interference pattern formed by the superposition of the image modulated object beam and the reference beam near the line focus of the image is recorded on the sheet of holographic recording medium mounted on an incrementally driven movable platen. Each frame of the motion picture film is thus recorded as a vertical strip hologram, and the full sequence of frames is recorded as a series of adjacent, laterally spaced strip holograms on the holographic recording medium. The resulting composite hologram is viewed by bending it into a cylindrical shape and placing a point source white light such as a small, bright, incandescent bulb, on the axis of the cylinder in a position corresponding to the position of the reference beam source relative to the holographic recording medium when the hologram was recorded. The resulting composite image is an accurate three-dimensional reconstruction of the subject without vertical parallax and in rainbow colors. Geometrically, the hologram formed by this prior art method is approximately equivalent to the white light viewable "rainbow hologram" developed around 1969 by Steve Benton of Polaroid Corporation wherein white-light viewability is obtained by restricting monochromatic viewability to a thin horizontal line as illustrated in U.S. Pat. No. 3,633,989. Further techniques for forming composite holograms which are not viewable in white light, are described in "Optical Holography" by Collier, Burckhardt and Lin, Academic Press 1971. A further development of the above described system of the Multiplex Company allows synthesizing strip-multiplexed holograms without the use of a reference beam. According to this method, a holographic diffraction grating is synthesized by projecting an unmodulated object beam and the reference beam onto the holographic recording medium. The diffraction grating thereby produced is then placed in contact with the holographic recording medium, the reference beam is removed, and the sequence of images (the object beam) is projected as before, each image serving to spatially amplitude-modulate the blank frame holographic diffraction grating which is thus contact printed onto the holographic recording medium in a series of laterally displaced vertical strips. The result is a synthesized holographic three-dimensional image having a quality comparable to images previously made on holographic recording medium using a reference beam.

While the developments of the Multiplex Company represent a significant advance in the state of the art, the system nevertheless exhibits several disadvantages and problems. The large spherical and cylindrical lenses in the system are only suitable for producing one size of synthesized hologram without introducing distortions. To scale up the system to relatively large holograms, for example, larger than 50 centimeters, very large spherical and cylindrical lenses are required which are prohibitively expensive, cumbersome and hence impractical. Furthermore, the lens geometry required by the necessity that the reference beam originate along the axis of the object beam cylindrical lens prohibits certain configurations of the reference beam and certain positions of the reference beam relative to the image.

The input systems for strip-multiplexed holography have generally been limited to cinema film projectors. Therefore, prior art strip-multiplexed hologram systems are not suitable for applications where a short recording time is required such as, for example, in medical diagnoses. No provision has been made in the past for image generation using a video projection kinescope or an image convertor such as the Itek PROM.

Other problems associated with prior strip-multiplexed hologram synthesizers is that they have no provision for producing holograms viewable without distortion in a flat display mode using a point illumination source. The prior systems do not process the object beam to produce higher quality images such as may be produced by using spatial filtering at the Fourier plane for image enhancement or reduction of the effects of grain in the image, or by using electronic image enhancement in connection with a video projector.

SUMMARY OF THE INVENTION

It is an object of this invention to provide a system capable of synthesizing relatively large strip-multiplexed holograms and capable of synthesizing strip-multiplexed holograms over a wide range of sizes.

It is another object of this invention to provide a system for synthesizing strip-multiplexed holograms without the use of large and hence expensive lens systems.

It is another object of this invention to provide a system for synthesizing strip-multiplexed holograms which is easily adapted to various image generating techniques, which is capable of synthesizing both transmission and reflection holograms, which is capable of synthesizing flat holograms viewable with a point light source without distortion, and which is capable of synthesizing multicolor strip-multiplexed holograms.

Another object of this invention is to provide a system for synthesizing strip-multiplexed holograms which allows a great deal of flexibility in orienting the reference beam with respect to the object beam.

It is still another object of the invention to provide a system for synthesizing strip-multiplexed holograms without the use of a reference beam.

It is a further object of this invention to provide an optical device which simultaneously shapes an anamorphic image bearing wavefront into a substantially cylindrical wavefront, and superimposes a reference beam onto the cylindrical wavefront.

It is a still further object of this invention to provide a system for transforming conventional multiplexed holograms into image plane holograms.

These and other objects of the invention are provided by sequentially projecting a plurality of two-dimensional images of coherent or nondiffuse light through an anamorphic lens system positioned directly beyond the image projector so that the image is compressed along a first axis and expanded along a second axis orthogonal to the first axis. Since the anamorphic lens system is placed relatively close to the cinema film, the cross-sectional area of the image or object beam is relatively small at the lens system thereby allowing the use of relatively small lenses. The narrow object beam is then projected a relatively large distance to an axially elongated cylindrical lens placed directly before the holographic recording medium. The cylindrical lens focuses the object beam to a narrow strip on the film. For each sequentially projected, two-dimensional image, the holographic recording medium is sequentially shifted in a direction perpendicular to the recorded strip so that a plurality of parallel, laterally displaced strips are recorded on the film. In one embodiment, the cylindrical lens includes an elongated beamsplitter parallel to the elongated cylindrical lens. This structure performs two functions: it forms a substantially planar object wavefront into a substantially cylindrical wavefront, and it superimposes a reference beam incident from the side onto the cylindrical wavefront. In this regard, the term "planar wavefront" is used to mean any wavefront that has traveled a substantial distance from a relatively small source, while "cylindrical wavefront" is used to mean any wavefront that converges to a line focus.

Another embodiment includes an anamorphic projection system in connection with a holographic diffraction grating to contact-print each strip hologram in the form of a holographic diffraction grating spatially modulated by the projected anamorphic image, onto a holographic recording medium without the use of a reference beam.

BRIEF DESCRIPTION OF THE FIGURES OF THE DRAWINGS

FIG. 3 is an isometric view of a system for synthesizing strip-multiplexed holograms utilizing a horizontal holographic recording medium transport and a video projection kinescope for spatially modulating the object beam.

FIGS. 4A–4E are an isometric pictoral illustrating several anamorphic lens systems which may be employed in the synthesizing systems of FIGS. 1–3 including, in FIG. 4E, a spatial filter 51 placed at a focus in the beam path to selectively attenuate particular spatial frequencies in the image.

DETAILED DESCRIPTION OF THE INVENTION

Figure 1:
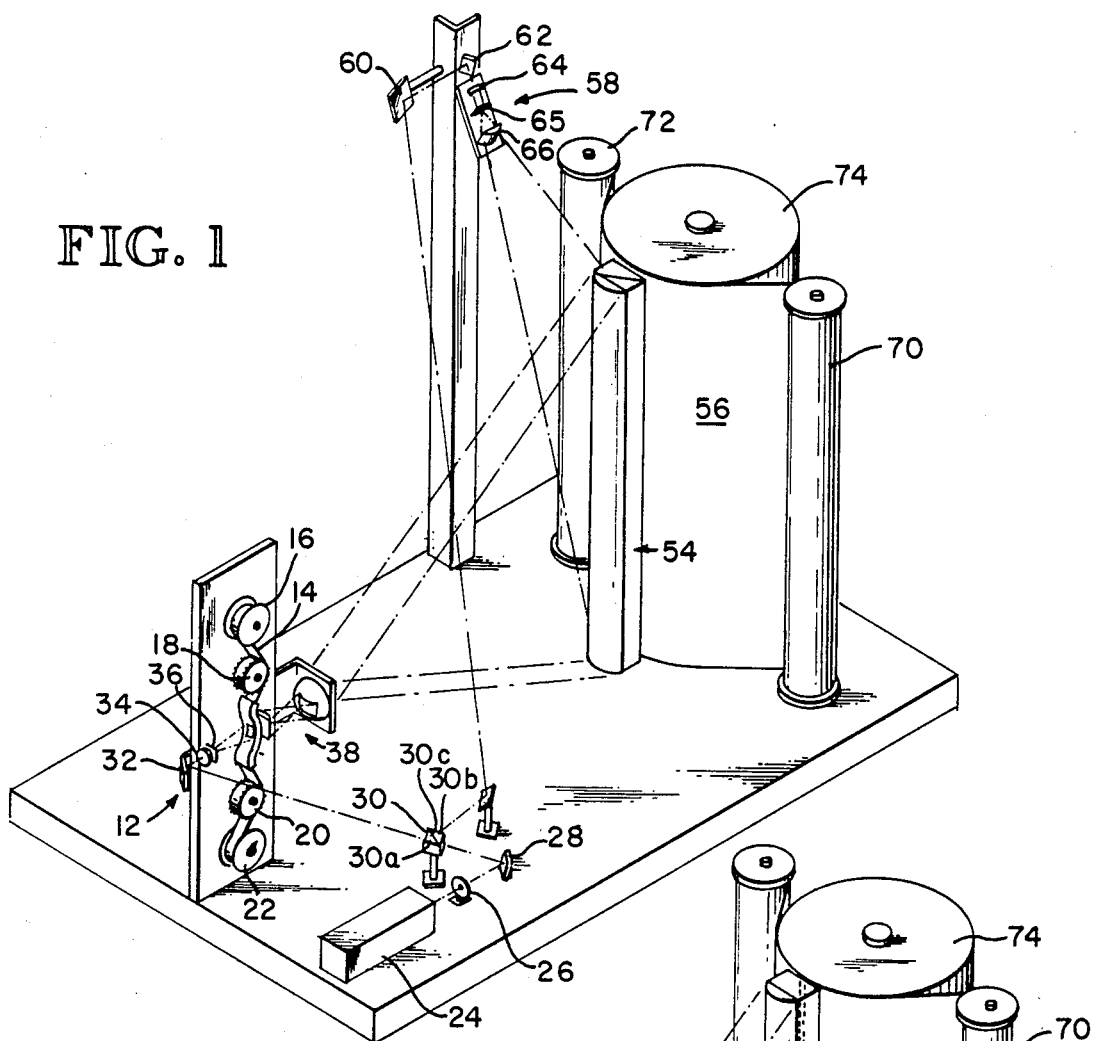
FIG. 1 is an isometric view illustrating one embodiment of the system for synthesizing strip-multiplexed holograms using a reference beam.

One embodiment of the invention utilizing a cinema film projector 12 to modulate the object beam is illustrated in FIG. 1. The cinema film 14 is made by placing a subject on a turntable rotating at a constant speed and photographing the subject with a cinema camera running at a constant speed. Each frame of the resulting cinema film 14 is a view of the subject taken from a different angle. The film is placed on a film transport mechanism including a plurality of rollers 16,18,20, 22 two of which, 18,20, are rotatably driven and advance the film 14 by means of sprockets on their outer pheriphery which mate with equally spaced sprocket holes on the film 14. Film transport systems of similar function are conventionally used with virtually all types of cinema projection equipment. Coherent, nondiffuse light from a laser unit 24 is coupled to the projection unit 12 through a shutter 26, a mirror 28 and a beamsplitter 30. A laser beam emerging from the beamsplitter 30 is aligned with the projection axis of the projector 12 by a mirror 32 and passes through a short focal length lens 34 such as a microscope objective which causes the beam to converge. After passing through a pin hole filter 36 which removes coherent noise from the beam, the beam diverges and passes through the cinema film 14 and is projected by an anamorphic lens system 38. The anamorphic lens system 38 compresses the beam horizontally while expanding it vertically so that the object beam is transformed to a narrow vertical strip. Various anamorphic lens systems which may be employed are illustrated in FIG. 4. In FIG. 4a and FIG. 1, the diverging beam 40 passes through the film 14 and is focused to a line by a cylindrical lens 42. A spherical lens 44 placed beyond the focal length of the lens 42 causes the beam to diverge along a vertical axis but does not expand the beam substantially along the horizontal axis. Other anamorphic lens systems include a single cylindrical lens 46 beyond the film 14 (FIG. 4b), a spherical lens 48 positioned in front of the film 14 followed by a cylindrical lens 46 (FIG. 4c), projecting the image from the film 14 through a spherical lens 48 and then through a cylindrical lens 46 (FIG. 4d) and placing the film 14 between a pair of spherical lenses 50 followed by a cylindrical lens 52 (FIG. 4e). Other anamorphic lens systems can also be employed. By placing the lens system 38 directly in front of the projection system 12, the beam is transformed at a point where the cross-sectional area of the beam is relatively small, allowing the use of relatively small lenses. Prior art systems which place the lens system 38 a substantial distance from the projection system 12 and at a point where the beam has diverged significantly require the use of much larger lenses in their anamorphic lens system. The narrow, vertically oriented beam is projected from the lens system 38 to an axially elongated vertical, cylindrical lens 54 which forms the beam into a cylindrical wavefront and projects it onto a sheet of holographic recording medium 56.

It is advantageous to separate the anamorphic image projection components of the total optical system from those components which form the cylindrical object wavefront recorded on the holographic recording medium because the separation allows use of much less bulky and expensive lenses than would be otherwise required if, for example, the cylindrical wavefront and the anamorphic image were formed from an enlarged image by a single large cylindrical lens as in the Multiplex Company's system.

The beamsplitter 30 in FIG. 1 is of a conventional variety including, for example, a pair of prisms 30a,b separated by a partially reflective, partially transmissive surface 30c so that two beams emerge from the beamsplitting 30. The beam projected onto the mirror 32 becomes the object beam while the other beam emerging from the beamsplitter 30 subsequently becomes the reference beam. The reference beam is aligned with the axis of a reference beam projector 58 by a pair of mirrors 60,62. The reference beam projection system 58 may include, for example, a short focal length lens 64, such as a microscope objective, which causes the beam to converge, a pinhole filter 65, and a cylindrical lens 66 in approximately confocal relationship with the short focal length lens 64 which projects the reference beam onto the lens-beamsplitter 54 as a narrow, vertical strip.

The structure of various embodiments of the lens-beamsplitter are illustrated in FIG. 5. In the simplest form (FIGS. 1, 5a), the lens-beamsplitter 54 includes a pair of elongated triangular prisms 54a,54b separated by a partially reflective, partially transmissive layer 54c. A cylindrical lens 54d is secured to one face of the prism 54b for transforming the object wavefront from the anamorphic lens system 38 to a substantially cylindrical wavefront and focusing it to a narrow strip. The narrow, cylindrical wavefront is then transmitted onto the film 56 through the partially transmissive surface 54c. The reference beam from the reference beam projector 58 is incident on the sidewall of prism 54a and is reflected in the general direction of the object beam by the partially reflective surface 54c. Thus, the reference beam is superimposed onto the object beam at the surface of the film 56. The remaining lens-beamsplitter structures illustrated in FIG. 5, similarly modify and redirect the object and reference beams to superimpose them according to well known principles of optics which are familiar to one skilled in the art.

As the object and reference beams are superimposed on the holographic recording medium 56, the interference pattern thereby produced along a narrow, vertical strip is recorded. The strip hologram is actually a spatial modulation of the amplitude of the interference pattern formed by the reference beam and the unmodulated cylindrical object beam. The holographic recording medium 56 is carried by a film transport system including a takeup roller 70, a supply roller 72 and a rotatably-mounted platen 74. The takeup roller 70 and platen 74 are periodically rotated by discrete amounts by conventional drive systems such as stepping motors (not shown). The lens-beamsplitter 54 services a dual purpose. First, as mentioned above, it forms the wavefront of the anamorphic projected image into a substantially cylindrical converging wavefront. Second, it permits superposition of a reference beam of arbitrary orientation onto the focal line of the converging wavefront. A cylindrical Fresnel lens may also be used instead of the cylindrical lens portion of the lens-beamsplitter 54.

In a typical operating mode of the system for synthesizing strip-multiplexed holograms of FIG. 1, the cinema projector 12 advances the film 14 to the next frame and the holographic recording medium 56 is advanced a discrete increment while the shutter 26 is closed. After a predetermined time during which system vibrations damp out, the shutter 26 is opened for a predetermined time to project the object beam and reference beam onto a narrow strip of the holographic recording medium through the lens-beamsplitter 54. The shutter 26 is then closed, the cinema film 14 is advanced to the next frame, the holographic recording medium 56 is incrementally advanced and the next hologram strip is exposed. There are many useful variations on this sequence, including multiple exposures and multiple holographic recording medium advances per single cinema frame advance. The resulting strip-multiplexed hologram is viewed by bending it into a cylindrical shape and illuminating it with a point light source such as a small, incandescent light bulb placed along the axis of the cylinder in a position corresponding to the position of the reference beam relative to the holographic film source in the system of FIG. 1. A clear three-dimensional image of the subject appears in the center of the cylinder. If the relationship between the positions at which the hologram strips are recorded corresponds to the angular relationship at which the cinema frames were exposed, and if the angle of convergence of the cylindrical wavefront formed by the lens-beamsplitter 54 corresponds to the angle of view of the cinema camera that recorded the cinema frames, then the synthesized holographic image appears undistorted. Relatively major departures from exact angular correspondence can produce subjectively acceptable images.

Figure 2:
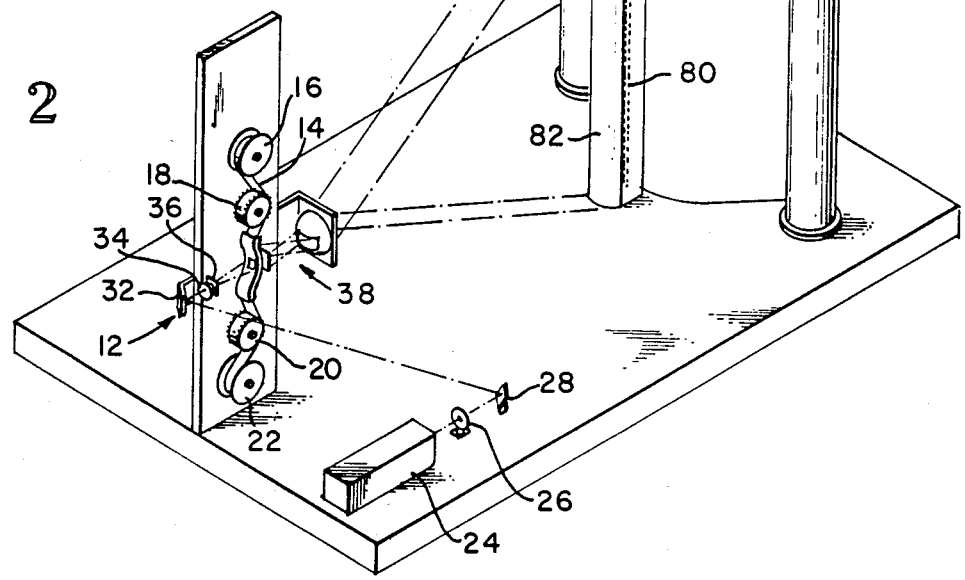
FIG. 2 is an isometric view of a system for synthesizing strip-multiplexed holograms using a contact-printed holographic diffraction grating instead of a reference beam.
Figure 5A:
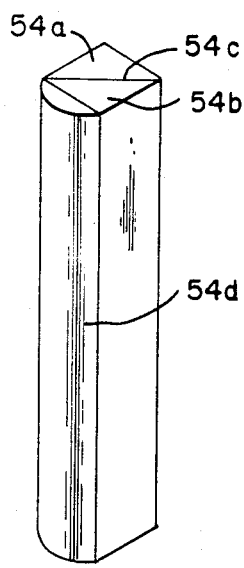
FIGS. 5A–5L are isometric views illustrating several lens beamsplitter structures which may be utilized in the synthesizing systems of FIGS. 1 and 3.
Figure 5B:
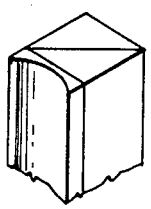
Figure 5C:
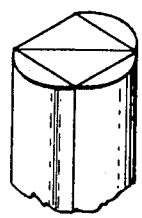
Figure 5D:
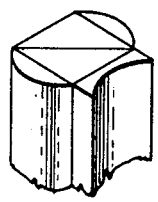
Figure 5E:
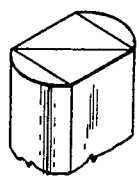
Figure 5F:
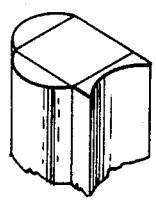
Figure 5G:
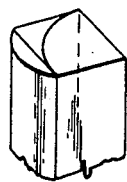
Figure 5H:
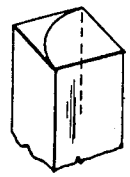
Figure 5I:
Figure 5J:
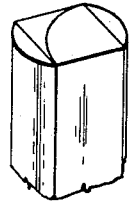
Figure 5K:
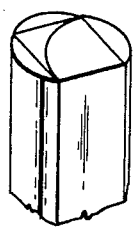
Figure 5L:
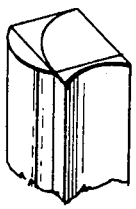

Another embodiment of the invention, capable of synthesizing strip-multiplexed holograms without a reference beam, is illustrated in FIG. 2. Therein, a holographic diffraction grating 80 is contact printed by the object beam onto the holographic recording medium thereby producing a grating pattern on the holographic recording medium 56 essentially indistinguishable from the interference pattern produced by the object and reference beams of the system of FIG. 1. Consequently, the pattern recorded on the holographic recording medium 56 is essentially identical for strip-multiplexed holograms synthesized by either system. The holographic grating 80 is made in a system similar to that shown in FIG. 1 by making a single exposure without modulating the object beam, i.e., without any film in the film projector 12. The single strip hologram thus formed is identical to the image-bearing strip hologram formed by a single exposure on the system of FIG. 1, except that the hologram formed in the system in FIG. 1 is spatially amplitude modulated according to the intensity distribution in a cinema frame, while the hologram made without cinema film in the projector contains only the phase (direction) information which is common to all of the strip holograms formed in the system in FIG. 1. When an image is projected through the holographic grating 80 onto the holographic recording medium 56, the holographic grating 80 is contact-printed onto the holographic recording medium 56, but with the intensity distribution of the image modulated object beam. The resulting amplitude modulated holographic grating printed onto the holographic recording medium is virtually indistinguishable from a strip hologram synthesized by the system of FIG. 1. In fact, the only material difference is a change in the contrast of the image. With the system illustrated in FIG. 2, a lens-beamsplitting is not required since a reference beam is not used. A cylindrical lens 82 can be used instead of the lens-beamsplitter. In fact, if the anamorphic projection system 38 is made capable of projecting an image as narrow as the holographic grating 80, the cylindrical lens 82 may be dispensed with entirely. Although the object beam is desirably formed by laser radiation, it is not necessary to use a laser since any sufficiently nondiffuse light source, such as a quartz-halogen bulb, will produce satisfactory holograms.

A third embodiment of the system for synthesizing strip-multiplexed holograms is illustrated in FIG. 3. The system is functionally similar to the system illustrated in FIG. 2 except that the object beam is modulated by a video projection kinescope instead of a cinema film projector. The video projection kinescope 90 includes an electron gun 92 which directs electrons to the face of the kinescope 90 in accordance with a signal produced by a video camera (not shown) directed toward the subject. The face 94 modulates the nondiffuse light generated by the laser 24 so that the object beam projected by the kinescope 90 carries a nondiffuse image of the subject. The image on the kinescope must be appropriately aligned with respect to the projection system, of course. Light from the laser 24 is conveyed to the kinescope 90 by a mirror 96 through a short focal length lens 98 and a pinhole filter 100. The object beam emerging from the kinescope 90 immediately passes through an anamorphic projection system consisting of a spherical lens 102 followed by a cylindrical lens 104 so that a narrow, horizontally elongated beam is transmitted toward the holographic recording medium 108 mounted on the transport 107. The narrow object beam is incident on a lens-beamsplitter 106 which reforms the object beam into a substantially cylindrical wavefront and reflects it 90 degrees to project it through a diffraction grating (105) onto a holographic recording medium. Note that the lens-beamsplitting 106 does not perform a beamsplitting function in this application. Accordingly, an axially elongated cylindrical lens and an elongated mirror in the same relative positions as the lens and reflective surface in the lens-beamsplitter will function equivalently to the lens-beamsplitter in this application.

Figure 6:
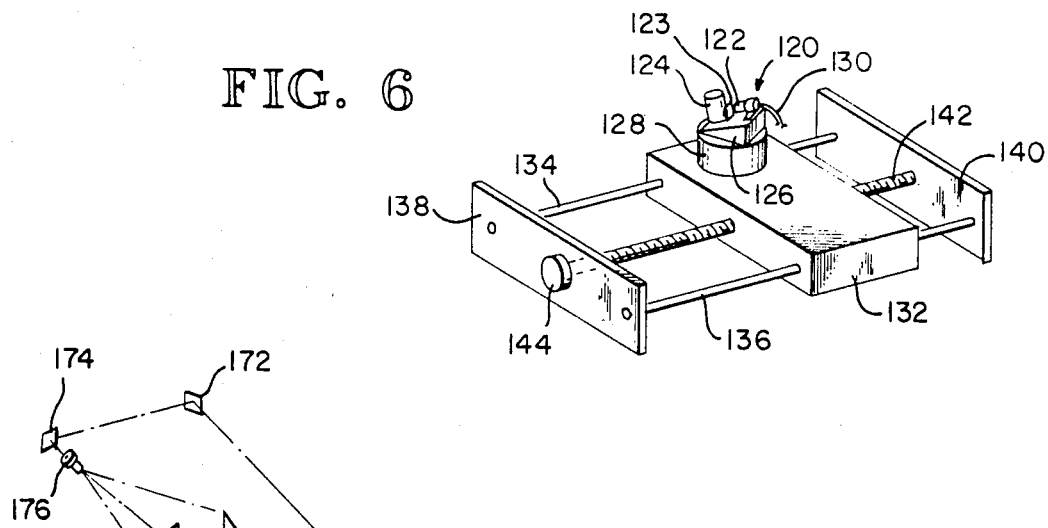
FIG. 6 is an isometric view of a device for varying the orientation of the reference beam with respect to the object beam and holographic recording medium which is utilized to synthesize strip-multiplexed holograms which are viewable without distortion in a flat plane when illuminated by a point light source.

The systems illustrated in FIGS. 1-3 synthesize holograms that are properly viewed in a cylindrical geometry. That is, the hologram is bent into a cylindrical shape and illuminated with a point light source on the axis of the cylinder. The reason for this is that the light illuminating the hologram for display purposes should strike the hologram at the same angle with which the reference beam strikes the hologram while the hologram is being recorded. For the systems illustrated in FIGS. 1-3, the reference beam strikes the hologram at the same horizontal angle, i.e., 90 degrees, at all points along the hologram. However, where a point light source illuminates a flat hologram, the light strikes the hologram at an angle that varies horizontally along the hologram. Thus, in order to produce a hologram that is properly displayed flat, the angle at which the reference beam strikes the hologram must be varied during recording. For this purpose, the reference beam projector 58 (FIG. 1) may be mounted on a motorized carrier so that the angle of incidence of the reference beam may be changed in small increments as subsequent cinema frames are projected and the holographic recording medium is advanced. One embodiment of a device for performing this function is illustrated in FIG. 6. A reference beam projector 120 including a short focus lens 122, a pinhole filter 123, and a cylindrical lens 124 is secured to a turntable 126 which is rotatably driven in precisely controlled increments by a stepping motor 128. Laser radiation is conveyed to the short focal length lens 122 preferably through a fiber optic wave guide 130 of conventional variety. The stepping motor 128 is fixedly secured to a platform 132 which is slidably secured to a pair of parallel rods 134,136 between a pair of members 138,140. The platform 132 is moved along the rods 134,136 by the rotation of a screw 142 which is connected to a stepping motor 144 and hence rotatable in small, precisely controlled increments. As the cinema frames are sequentially projected and the holographic film is advanced, the platform 132 moves from one member 138 toward the other 140 and the turntable 126 rotates so that the reference beam projector directs the reference beam at a different angle at each strip on the hologram. For example, at the center of the hologram, the reference beam strikes the holographic recording medium 56 at 90 degrees while at one end it may strike the holographic recording medium at a horizontal angle of 45 degrees and at the other end at −45 degrees depending on the width of the hologram and the location at which the point illumination source is to be placed. Thus, if the hologram thereby produced is six inches wide, it is properly displayed flat by a point light source placed three inches out from the center of the hologram. The path of the cinema camera with respect to the subject will, of course, affect the degree of distortion with which the subject appears on the hologram. If the cinema camera moves in a straight line past the subject and always points in a direction perpendicular to the line of motion, the subject will appear virtually undistorted. Since the shape of the holographic recording medium, when it is properly displayed, preferably corresponds to the path along which the cinema camera moves relative to the subject, it can be seen that, given knowledge of the camera's orientation and path, a system incorporating a movable reference beam projector such as that illustrated in FIG. 6, for example, can be used to synthesize a strip-multiplexed hologram of the subject from the sequence of frames recorded by a cinema camera moving along any arbitrary path relative to the subject. For example, a versatile system could be used to synthesize an accurate, relatively distortion free strip-multiplexed hologram of Mars from a sequence of photographs taken on a fly-by mission.

The distortion induced by using a point illumination source for flat display of a strip-multiplexed hologram synthesized without the use of a movable reference beam is substantially equivalent to a lateral displacement of the reconstruction of each strip hologram by an amount that increases in a direction generally away from the central region of the strip-multiplexed hologram. This effect may be compensated by laterally displacing each strip hologram's image modulation relative to its phase (directional) modulation such that the image modulation of each strip is displaced toward the center of the strip-multiplexed hologram relative to its grating pattern by an amount which increases with distance from the center of the hologram. In practice, the compensating lateral displacement of image modulation as opposed to directional modulation may be accomplished by several alternate means:

1. By slightly tipping the cinema camera horizontally relative to the subject by an amount which increases with the camera's distance from the central position on its path, in the case of straight line motion. This displaces each frame's image in the frame.

2. By slightly laterally displacing the holographic diffraction grating used in FIG. 2 by an amount which increases with the number of the frame being exposed, with the central frame considered to be the zeroth frame, preceding frames considered to be negatively numbered, and following frames considered to be positively numbered.

3. By slightly laterally displacing the anamorphically projected frames in FIG. 2 by an amount which increases with the number of the frame being exposed, with the central frame considered to be the zeroth frame, preceding frames considered to be negatively numbered, and following frames considered to be positively numbered. This may be accomplished by means of a beam displacement system such as an incrementally rotatable, motor mounted prism positioned between the pinhole filter and the cinema film 14 in FIG. 2.

Holograms which can be displayed flat and illuminated with a point light source can also be synthesized by the system illustrated in FIG. 2 by varying the diffraction grating contactprinted on the film in order to simulate a reference beam which strikes the film at varying angles as the hologram is made. In other words, each hologram strip may be recorded using a different holographic grating. This is accomplished by generating a sequence of holographic grating by utilizing the reference beam projector illustrated in FIG. 6 while projecting an unmodulated object beam from the object beam projector 38 (FIG. 1). Each of the hologram strips recorded from one side of the holographic recording medium 56 to the other as the platform 132 moves from one frame 138 to the other 140, simulates the reference beam striking the lens-beamsplitter 54 at a different angle. A strip-multiplexed hologram is then synthesized by projecting the cinema film while advancing both the holographic recording medium 56 and the holographic grating so that the strip-multiplexed hologram thereby produced may be viewed flat with a point light source. Alternatively, the same grating may be used at each step, but slightly offset each time relative to the projected image to produce an equivalent effect. This amounts to an approximate distortion-correction scheme utilizing the fact that illuminating the grating from the side produces a laterally displaced (slightly rotated) projection of the diffracted image, while displacement of the image modulation relative to the grating can displace the projection of the diffracted image in an opposite sense.

Figures 13, 14:
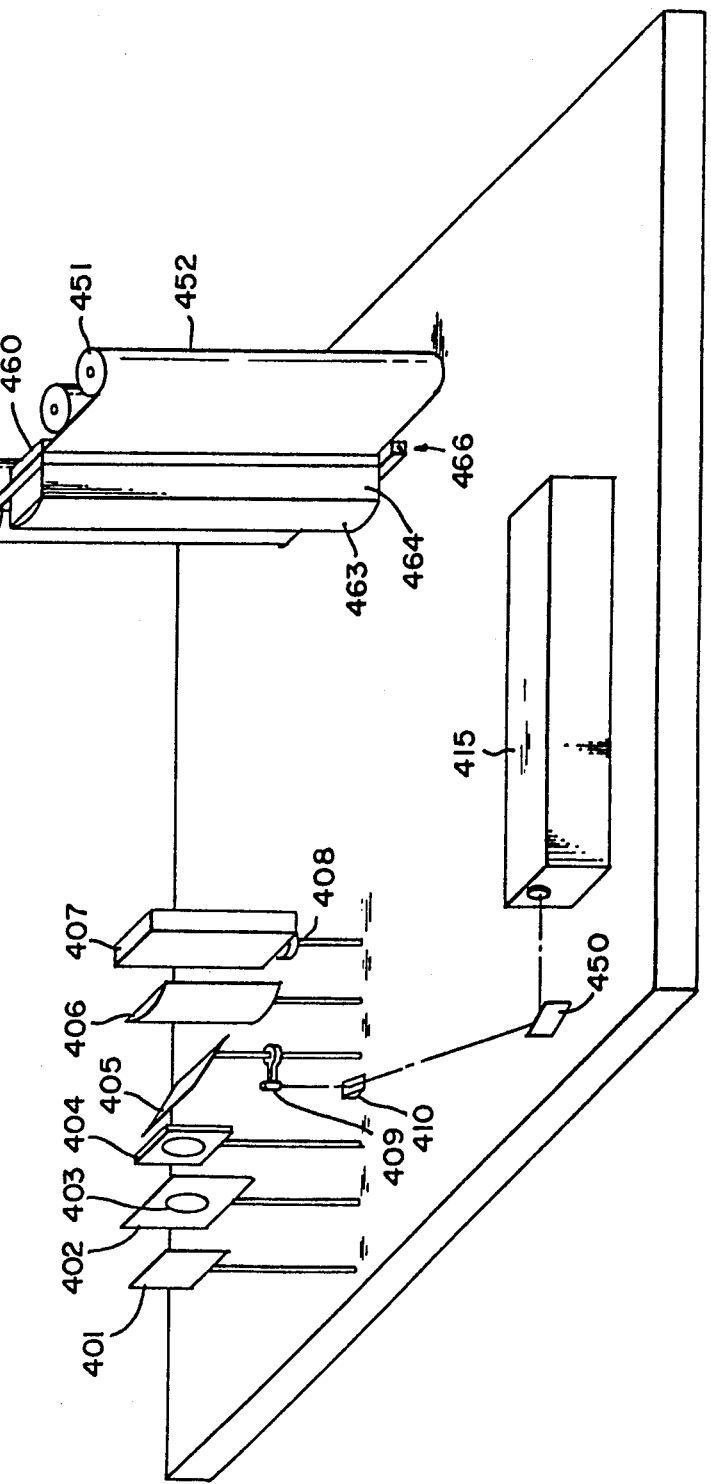
FIG. 13 is an isometric view illustrating an embodiment of the system for synthesizing strip multiplexed black and white or multicolor reflection or transmission holograms using a diffraction grating or volume hologram reflecting and transforming means instead of a reference beam.
FIG. 14 illustrates a glass plate and transport mechanism with a plurality of diffraction gratings or volume holograms mounted thereupon.

FIG. 14 illustrates an assembly of conventional holographic grating 605 used in either transmission or reflection for contact printing phase information without need for a reference beam. The gratings are mounted on a transport mechanism 610 for selecting the particular grating to be contact printed, and its position relative to the image information. The gratings may correspond to different colors, different reference beam positions, or both as is well known in the art. A conventional unilateral diffuser required for extending viewing angle or producing monochromatic or black and white holograms can be included holographically in the gratings. Furthermore, when used as reflecting and transforming means, the holographic grating assembly may be an assembly of volume reflection holograms made with one or more colors, singly or multiply exposed to form from the incident image bearing beam a monochromatic or multicolored reference beam configured so as to generate a reflection hologram in the holographic recoding medium. If the volume reflection holograms in the assembly are made using a nondiffused reference beam and an unmodulated, vertically diffused beam, an identically diffused image bearing object beam will form a nondiffused reference beam upon reflection from the volume reflection holograms.

Figure 7:
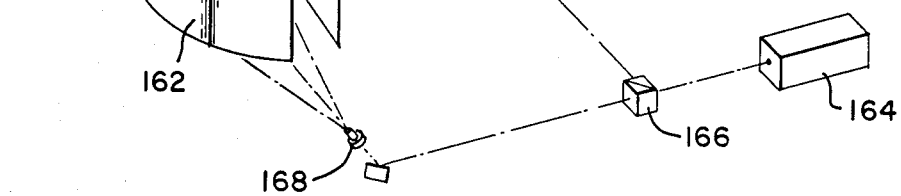
FIG. 7 is an isometric view illustrating a technique for synthesizing image-plane holograms by the process of image plane transfer.

The system for synthesizing strip-multiplexed holograms may also be used to generate image plane holograms. An image plane hologram is a hologram of a focused image in which the image appears to be intersected by the surface of the holographic recording medium so that the image appears to extend both before and beyond the holographic recording medium. One technique for producing image plane holograms is to perform an "image plane transfer" from a cylindrical hologram produced on one of the systems illustrated in FIGS. 1–3. The image plane transfer may be accomplished, for example, by the technique illustrated in FIG. 7. A cylindrical hologram 160 is mounted on the inside of a concave cylindrical mirror 162 and illuminated by a laser 164 projected through a beamsplitter 166 and a lens system 168. A reference beam produced by the beamsplitter 166 is projected onto the holographic recording medium 170 by mirrors 172, 174 and a reference beam projector 176. A real image of the subject appearing on the hologram 160 is formed at the center of the cylinder by reflection and is projected on the holographic recording medium. Alternately, instead of mounting a hologram on a cylindrical mirror, a much higher quality real image reconstruction may be obtained by making the original hologram in a surface-relief holographic medium, metallizing it to increase its reflectivity, and mounting resulting reflective surface-relief hologram on the inside of a cylindrical surface for reconstruction of its real image. Since the holographic film 170 is mounted at the center of the cylinder 162, the real image is recorded as a hologram. The resultant image plane hologram is properly displayed flat and illuminated with a point light source in a position corresponding to the position of the reference beam projector 176 relative to the holographic recording medium 170.

Figure 10:
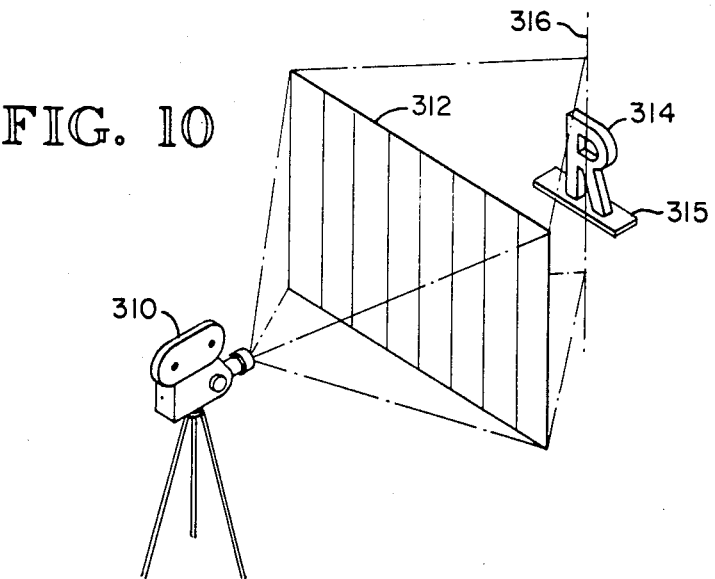
FIG. 10 is a schematic illustrating the studio technique by which cinema films are made for synthesizing strip-multiplexed image plane holograms.
Figure 11:
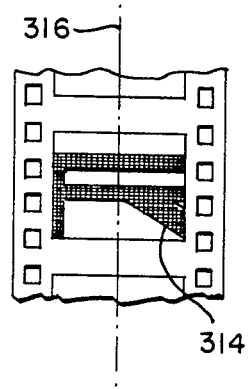
FIG. 11 is a schematic illustrating a typical single cinema frame recorded by the technique illustrated in FIG. 10.

A technique which is much more practical in most cases for generating image plane multiplexed holograms requires a cinema studio technique which may be termed "camera perspective transfer", illustrated in FIG. 10. A large vertical-axis cylindrical mirror, Fresnel cylindrical mirror, Fresnel cylindrical lens or like means 312 is used during filming to shift the effective viewpoint of the cinema camera 310 away from the location of the camera lens to a point 316 in the plane of the subject 314. The subject 314 may be mounted on a carriage which moves along a path perpendicular to the viewing axis of the camera 310 so that each frame of the resulting cinema film is a view of a different portion of the subject. The cinema frames (e.g., FIG. 11) will usually not contain individually recognizable images because they represent a viewpoint within the plane of the subject and sometimes a viewpoint actually within the subject itself; but when multiplexed into a hologram, the composite image will be that of the subject, with the image intersecting the hologram. By this means the image may be placed in any position desired relative to the hologram surface.

Figure 8:
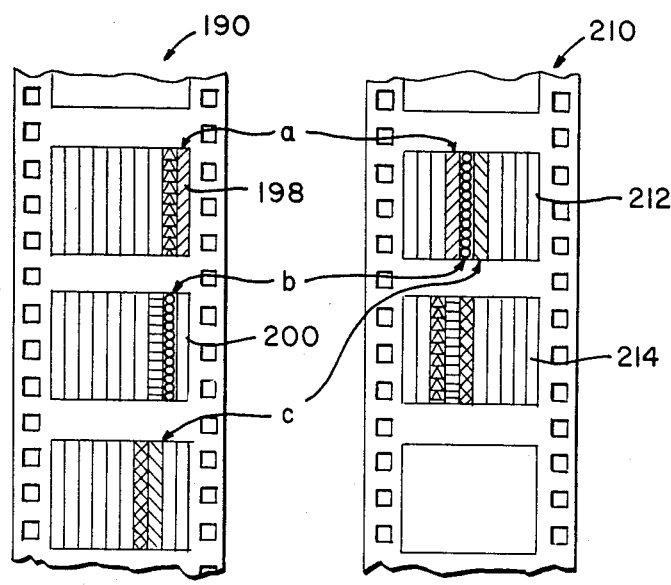
FIG. 8 is a schematic illustrating a technique for synthesizing image-plane holograms by recomposing the two-dimensional images forming the object beam.
Figure 9A:
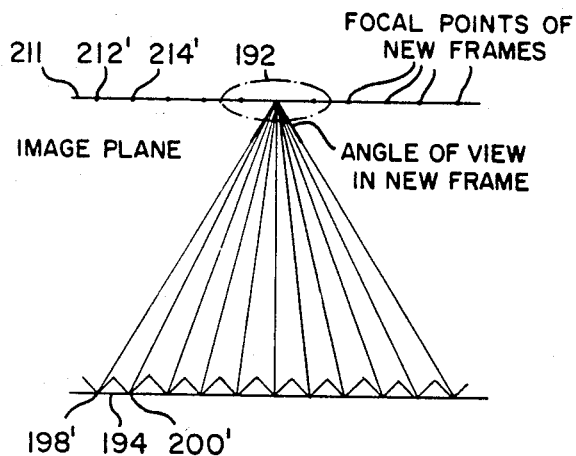
FIGS. 9A–9C are schematics illustrating the geometric concept by which image-plane holograms are synthesized according to the technique illustrated in FIG. 8.
Figure 9B:
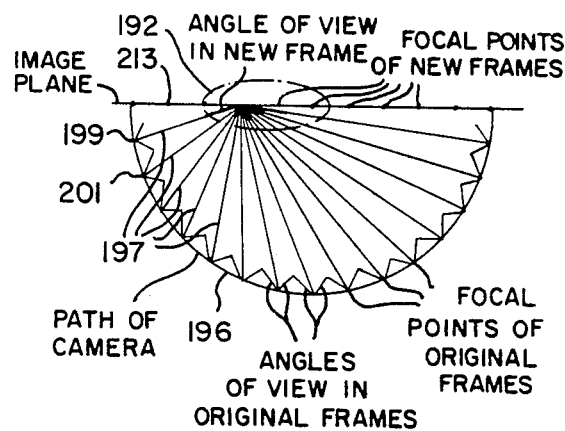

A mathematically equivalent but more difficult image plane technique having significant advantages in many non-studio applications including computer generated imagery and landscape holography, is that of generating a new sequence of cinema frames from the originally recorded sequence such that a new set of perspectives along the image plane 211 are generated for the new sequence as illustrated in FIG. 8. This is accomplished by a technique, termed "image perspective transfer", illustrated in FIGS. 8 and 9 in which the original cinema film 190 is taken of the subject 192 by moving the camera along a straight path 194 as illustrated in FIG. 9a, or a circular path 196 as illustrated in FIG. 9b, or in general along any path. In reference to the case wherein the camera moves along a straight path, the first frame 198 is taken at location 198' with the camera facing perpendicular to the camera path. The second original frame 200 is taken at location 200' in the same manner as frame 198. Each of the frames in the original film 190 are physically, optically, or otherwise, divided into a plurality of vertical strips. Each frame of the new film 210 is composed of a single strip from each of the frames of the original film 190 corresponding to the same location 212', 214' . . . on the image plane 211. Thus, new frame 212 contains that portion of each original frame 198, 200 . . . which show location 212'. The second new frame 214 contains that strip from each original frame which shows location 214'. The frames of the new film 210 are projected through the cinema film projector 12 (FIG. 1) in the same manner as the original film 190 in order to produce an image plane hologram.

Figure 9C:
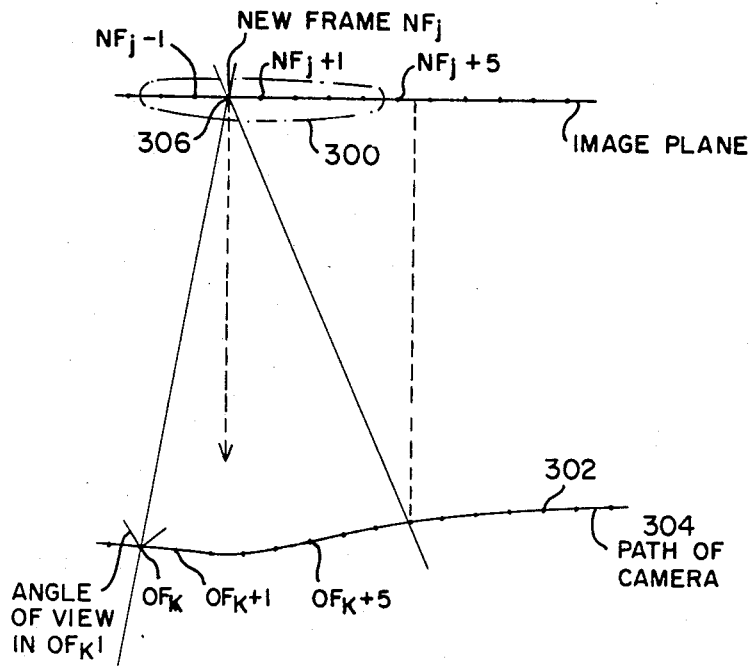

The general problem of perspective transfer may be viewed as follows:

Each frame of the original film 190 is essentially a projection of the subject 300 in FIG. 9c through a point 302 on the path 304 of the camera. Similarly, each frame of the new film 210 is a projection of the subject through another point 306 on an imaginary path to be represented by the shape of the resultant strip-multiplexed hologram. Since every strip image on a strip-multiplexed hologram corresponds to a point projection, the task in strip-multiplexing an image plane hologram consists of forming the new frames 210 from the information contained in the original frames 190. This is accomplished by assembling each new frame from a sequence of vertical strips, one taken from each original frame. FIG. 9c illustrates the means of composing a new frame, for example NFj, from a sequence of strips $NF_{j-N} \ldots NF_{j+h}$, taken from the frames $OF_{K-N} \ldots OF_{K+N}$ respectively.

The inventive system of FIG. 1, with such modifications as removing the beamsplitter portion of the lens-beamsplitter 54, placing the reference beam projector behind the holographic recording medium so that the reference beam is incident on the opposite side of the holographic film from the object beam and using a transparent platen 74, may be used to synthesize reflection holograms as well as transmission holograms. The resulting reflection hologram is viewed by illuminating it from the same side of the film as it is viewed. Because of the directional and spectral selectivity of reflection holograms, it is desirable to place a unilateral diffusing screen in front of the holographic recording medium in this configuration in order to make the resultant image viewable from all vertical angles. A unilateral diffusing screen diffusely transmits light incident thereto along one axis while nondiffusely transmitting light along an orthogonal axis. The unilateral diffusing screen must be oriented so that light is diffused only in the direction parallel to the length of each strip hologram. A well known example of a unilateral diffusing screen is a conventional lenticular screen. This technique for synthesizing reflection holograms, because of the color selectivity of reflection holograms, is particularly well suited to the synthesis of multicolor images by means of a multicolor laser and color cinema film. Another technique for synthesizing reflection holograms without the use of a reference beam is analogous to the system illustrated in FIG. 2. Instead of placing the holographic grating 80 (FIG. 2) in front of the holographic recording medium 56, a reflective holographic grating is placed behind the holographic recording medium on the opposite side from which the object beam is incident. The reflective holographic grating may be formed in substantially the same manner as the holographic grating 80 of FIG. 2, but using a medium which produces a surface-relief hologram, and using a unilateral diffusing screen. The surface of the resulting hologram is then metallized for optimum reflectivity. This reflective holographic grating then acts as a reflective analog to the contact-printed holographic grating used in the system of FIG. 2. The reflection hologram made by a single blank-frame exposure using a multicolor laser beam with the system of FIG. 1 modified to produce reflection holograms may be used instead of a metallized surface-relief holographic grating in this embodiment, with the advantage that a single multicolor exposure per colored cinema frame will suffice to produce a multicolor reflection hologram. The holograms produced in this embodiment of the invention are reflection holograms, equivalent to reflection holograms produced in the system of FIG. 1 using a reference beam behind the film. Instead of a reflective holographic grating, it is possible to use a Fresnel reflector with the same directional properties.

Although holographic film is the most common recording medium for holograms, any of the other existing holographic recording media may be used instead. Suitable media include photoconductor-thermoplastic recording media, dichromated gelatin films, photochromics, photopolymers, photoresists, and such devices as the Itek PROM.

Multicolor reflection holograms may be synthesized in accordance with the present invention as mentioned above. Specifically, the hologram is formed in a system similar to that illustrated in FIG. 1 with the reference beam generator mounted on the opposite side of the holographic recording medium 56 from the projector 12 so that the object beam is incident on the opposite side of the film from the reference beam. A vertical, unilateral diffusing screen placed close to the holographic recording medium, between the lens 82 (FIG. 2) and the holographic recording medium greatly increases the vertical viewing range of the recorded image. Because reflection holograms are generally color selective, the image is monochromatic and the same color as the laser light used to record the image if emulsion shrinkage is properly compensated for by well known techniques. Therefore, when a three color laser or three lasers of different colors are used in the system of FIG. 1 with a rear reference beam and a unilateral diffusing screen, a three color image is formed which, with proper balance of the beam energies, is in multicolor and may be viewed in white light.

A method of synthesizing multicolor transmission holograms by means of the present invention is to use the system of FIG. 1, but to substitute three separate reference beam projectors on the same side of the film as the cinema projector. Laser light of a different color is directed to each reference beam projector, and the three colors of laser light are combined into a single beam in the image projection system. The resulting hologram is ideally viewable with three different monochromatic sources placed in positions corresponding to the positions of the reference beam projectors relative to the holographic recording medium, but white light sources with colored filters are adequate for displaying a reasonably good natural color holographic image. This type of hologram, known as a coded reference beam multicolor transmission hologram, and analogous holograms are discussed in "Optical Holography" referred to above.

When a single movable reference beam projector is substituted for the three reference beam projectors mentioned above, and a single color laser is used, and separate exposures are made with the reference beam projector in slightly separate vertical positions, another type of multicolor hologram results which gives vivid multicolor effects when illuminated with a single white light source.

In order to make multicolor transmission holograms in a system employing holographic gratings as in FIG. 2, it is preferable to use a colored cinema film and three separate holographic gratings made with three lasers generating different color light in a system similar to the one illustrated in FIG. 1 as described above. To generate the gratings, a unilateral diffusing screen is positioned between the holographic recording medium and the lens-beamsplitter, and the reference beam for each holographic grating is projected from a different vertical position using a laser beam of a different color. The multicolor holograms are synthesized by making three exposures for each strips, each exposure being made with an object beam of a different color in conjunction with the corresponding holographic grating. The resultant hologram is a multicolor coded reference beam hologram viewable by means of three colored light sources placed in appropriate positions relative to the hologram. In a directly analogous manner, multicolor holograms may be made in a system similar to that illustrated in FIG 2, but employing a reflective surface relief holographic grating on the opposite side of the holographic film from the projector.

A more convenient multicolor system is similar to the system illustrated in FIG. 2, but employs a three color laser or three colinear laser beams of different colors in the object beam. A high efficiency single blank-frame multicolor reflection hologram is placed beyond the holographic film and in close proximity to it. This high efficiency reflection hologram is made on a system similar to that illustrated in FIG. 1, but with a unilateral diffusing screen placed close to the holographic recording medium between the lens and the holographic medium. Dichromated gelatin is one of the suitable holographic recording media in this application. The holograms made with this embodiment of the system using color cinema film in the projector may be natural color reflection holograms viewable by a point source of white light placed in an appropriate position. A Fresnel reflector may be used instead of a reflection hologram in this application.

Figure 12:
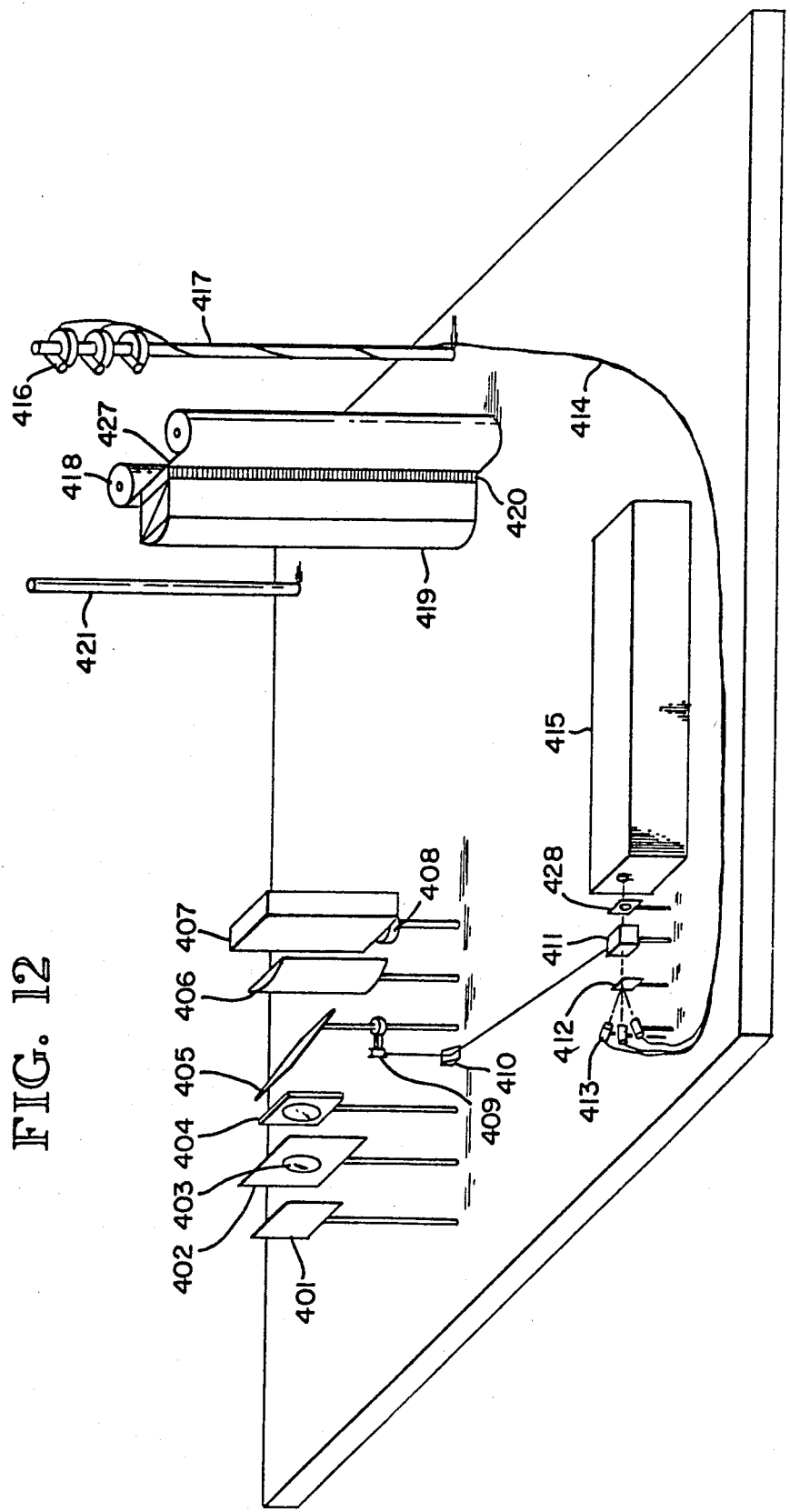
FIG. 12 is an isometric view illustrating an embodiment of the system for synthesizing strip multiplexed black and white or multicolor reflection or transmission holograms using a variable reference beam geometry, an incoherent-to-coherent convertor, and a mechanism for shifting the image amplitude information relative to the phase information.

FIG. 12 illustrates a versatile system incoporating capabilities for generating reflection, transmission, achromatic, monochromatic, and multicolor holograms with a wide range of display geometries including variable size, variable shape, and variable illumination source position. The system illustrated in FIG. 12 includes a conventional incoherent-to-coherent image convertor 404 which permits input of images in the form of video, film, or a real scene. In operation, an image (e.g., a cinema frame) is focussed upon a diffusing screen 401 by a film projector or other external means. A lens 403 focuses the image on the diffusing screen onto the input side of an incoherent-to-coherent image convertor 404 which may be, for example, a commercially available reflective liquid crystal/photoconductor "light valve". The output side of the image convertor is illuminated by laser light from a multiline laser 415 (e.g., a Krypton-Argon ion laser). Light from the laser passes through a shutter 428 and a beamsplitter 411, thence reflects off a mirror 410 and is diverged by a conventional spatially filtered beam spreader 409. The light then reflects off a large area beamsplitter 405 and is incident upon the image convertor. Laser light reflected from the image convertor, now bearing the image previously focussed upon the input side of the convertor, passes through the beamsplitter 405 and the cylindrical lens 406. Upon emerging from the cylindrical lens, the image bearing beam diverges in the vertical direction without changing its width substantially. The image bearing beam continues through a thick glass plate 407 mounted on a rotary transport mechanism 408. As is well known in the art, the plate 407 is capable of laterally displacing a light beam passing through the plate 407. Accordingly, the image bearing beam may be horizontally offset by altering the angular orientation of the glass plate by means of the rotary transport mechanism, thereby altering the position at which the beam enters the lens-beamsplitter 419. The glass plate 407 thus serves as a means for controlling the spatial relationship betwen the image information and the phase of the wavefronts recorded on the hologram. The image beam converges to a vertical line focus near the surface of the holographic film 427 carried by the holographic film transport 418. Reference beam generators 416 may be mounted at any height on the reference beam generator supports 417 and 421 and oriented to project one or more reference beams onto the holographic film. The system shown in FIG. 12 is arranged to make reflection holograms, but will make transmission holograms if the reference beam generators are moved to the other support 421. The reference beam path is from the beamsplitter 411 to a diffraction grating 412 which splits the multicolored laser light into its component colors. Beam receivers 413 insert single color beams into optical fibers 414 which conduct the beams to the appropriate reference beam generators 416. Alternatively, all colors may be projected from a single reference beam generator. A shutter 428 controls the exposure intervals. A conventional unilateral diffuser 420 may be inserted as shown to make transmission holograms viewable in either monochromatic or white light, or reflection holograms viewable over a wide vertical angle. FIG. 13 illustrates a versatile system for synthesizing strip multiplexed holograms without a reference beam. It accomplishes many of the functions of the system in FIG. 12, but is less vulnerable to the effects of vibration and does not require highly coherent light. The image carrying beam enters the cylindrical lens 463, passes through a glass block 464, and passes through a diffraction grating 465, thereby forming a contact print of the diffraction grating onto the holographic flim 418. The film 418 is moved by a transport mechanism 451. Alternatively, a reflecting and transforming means 460 may be used to record reflection holograms in the holographic film. These conventional reflecting and transforming mechanisms may include a fresnel mirror structured to reflect the object beam toward a predetermined point or volume reflection hologram made so as to reconstruct a point source when illuminated by an unmodulated object beam. The same structure 460 may contain a plurality of relecting and transforming means in adjacent strips, and be mounted on a transport mechanism as is the diffraction grating means 465.

The overall performance of any of the embodiments of the invention may be improved by employing spatial filters positioned at the foci of any of the lenses in the projection system. The spatial filters enhance or suppress certain spatial frequencies in the image in order to, for example, suppress the effects of the grain of the cinema film or the graininess of a video image. The grain, being of a certain typical size, is associated with a certain band of spatial frequencies which can be filtered out with a spatial filter in the "Fourier plane" of a spherical lens through which the image is projected with coherent light. Another useful application of spatial filtering is edge enhancement by which the edges of the image and other fine features appear brighter.

In all of the above-described embodiments, it is advantageous in some applications to provide a reference beam which converges toward a point on the opposite side of the holographic recording medium rather than diverging from a point. This may be accomplished by reflecting a diverging reference beam off a substantially cylindrical concave mirror to redirect it into a converging beam. The advantage to be gained by use of a converging reference beam is that the resulting hologram will focus the diffracted light into spectral bands in the vicinity of the optimum viewing position, thereby producing an image which appears to the observer to be free of vertical color gradients. By choosing the point of convergence of the reference beam, and by choosing the distance from the image projector to the holographic recording medium, the optimum viewing position may be predetermined from a wide range of possible positions.

One important advantage of the present invention over previous systems is that it can easily be used to synthesize holograms of a wide range of sizes without altering the size of the lens-beamsplitter. This is accomplished simply by changing the anamorphic projection system to project a beam having the desired height either by changing the lenses or by altering the lens positions, as in a zoom lens. Another important advantage of the present invention over previous systems is that, in the embodiment of FIG. 2 and in similar embodiments not requiring a reference beam, the system is virtually immune to environmental disturbances such as vibration and temperature changes in contrast to previous holographic systems which, being essentially large interferometers, are extremely sensitive to vibration and temperature variations. One immediate result of this advantage is that little or no settling time is required between exposures, resulting in much faster synthesis, or even realtime synthesis of a hologram. Another advantage is that coherent light is not required for synthesizing holograms thereby facilitating the use of projection kinescopes and other image conversion systems as the input media.

With the use of a video projection kinescope, such applications as generating three-dimensional X-ray images for diagnosis as well as computer generated holograms become more practical. Furthermore, the cost of the hologram is substantially reduced since the cost of the cinema film is eliminated.

Among the applications of the present invention are the synthesis of strip-multiplexed holograms for jewelry, advertising displays, educational displays, billboards and posters. Other applications are computer generated 3-D imagery, 3-D motion pictures, 3-D X-ray imagery, and 3-D imagery of the internal structure of objects by the use of other types of radiation, such as sound and subatomic particles.

The embodiments of the invention in which a particular property or privilege is claimed are defined as follows:

1. A system for synthesizing strip-multiplexed holograms, comprising:
   image projection means for sequentially generating a plurality of two-dimensional images in coherent light;
   anamorphic projection means for compressing said images in a first direction and expanding said images in a second direction to form an elongated object beam, said second direction being orthogonal to said first direction, said anamorphic projection means being positioned directly beyond said image projection means before said object beam has significantly diverged;
   reference beam generating means for generating an elongated reference beam of coherent light;
   holographic recording medium transport means for sequentially advancing a holographic recording medium in a predetermined direction by a predetermined increment for each two-dimensional image generated by said image projection means; and beam combining means spaced apart from said anamorphic projection means for transforming said image beam into a substantially cylindrical wavefront, superimposing said reference beam onto said cylindrical wavefront, and projecting said cylindrical wavefront and said reference beam together onto said holographic recording medium such that at least one strip hologram is recorded on said recording medium for each of said two-dimensional images to form a strip-multiplexed hologram.

2. The system of claim 1, wherein said image projection means comprise a cinema film projector system including cinema film transport means for sequentially advancing a strip of cinema film in single frame increments past a fixed projection aperture, and illumination means for projecting a beam of coherent light through said projection aperture thereby projecting a beam of coherent light modulated by the images on said cinema film onto said anamorphic projection system.

3. The system of claim 1, wherein said image projection means comprise:
a video projection kinescope including electron gun means directing electrons to the face of said video projection kinescope in accordance with a video signal; and
means for generating a beam of coherent nondiffuse light and projecting it onto the face of said video projection kinescope such that said face modulates the coherent light in accordance with the electron pattern on said face corresponding to said video signal.

4. The system of claim 1, wherein said image projection means comprise:
an incoherent-to-coherent image convertor including means for focusing a sequence of images onto the input face of said incoherent-to-coherent image convertor; and
means for generating a beam of coherent light and directing it onto said image convertor such that said image convertor spatially modulates said beam of light in accordance with said images focused onto the input face of said convertor.

5. The system of claim 1, wherein said anamorphic projection means comprise a cylindrical lens placed directly beyond said image projection means with the axis of said cylindrical lens extending along said second direction, said anamorphic projection means further including a spherical lens placed beyond the focal length of said cylindrical lens thereby causing said images to diverge along said second direction without diverging substantially along said first direction.

6. The system of claim 1, wherein said anamorphic projection means comprise a cylindrical lens positioned beyond said image projection means, said cylindrical lens having its axis extending along said first direction whereby said image diverges along said second direction without diverging substantially along said first direction.

7. The system of claim 1, wherein said anamorphic projection means comprise a spherical lens followed by a cylindrical lens having its axis extending along said first direction thereby diverging said image in said second direction without substantially diverging said image along said first direction.

8. The system of claim 1, further including means for synthesizing holograms viewable flat without significant distortion using a point light source comprising reference beam control means for adjusting the angle of incidence of said reference beam on said beam combining means as each image is recorded on said holographic recording medium such that the angle of incidence of said reference beam on said holographic recording medium for each strip hologram corresponds to the angle at which said point light source strikes each strip hologram when said hologram is displayed flat.

9. The system of claim 8, wherein said reference beam control means comprise:
a mounting platform including means for moving said platform along an axis substantially perpendicular to the surface of said holographic recording medium onto which said cylindrical wavefront and reference beam are incident, said platform moving in precisely controlled increments;
a turntable rotatably mounted on said mounting platform including means for rotating said turntable in precisely controlled increments; and
a reference beam projector fixedly mounted on said turntable for projecting said reference beam onto said beam combining means from a position controlled by the position of said mounting platform and at an angle controlled by the angle of said turntable.

10. The system of claim 1, further including means for synthesizing multicolor holograms comprising means for moving said reference beam generator means for controlling the angle at which a particular color component of the recorded image is reconstructed.

11. The system of claim 1, further including means for synthesizing multicolor holograms comprising a plurality of reference beam generator means for projecting a plurality of elongated reference beams of coherent light of differing colors onto said beam combining means while projecting coherent image beams of differing colors onto the said beam combining means.

12. The system of claim 1, further including a spatial filter placed at a point of focus of said object beam for enhancing and suppressing predetermined spatial frequencies in the two-dimensional images.

13. The system of claim 1, further including means for laterally displacing the image modulation for each of said strip holograms relative to its phase modulation such that the image modulation is displaced in the direction of the center of the strip-multiplexed hologram with respect to its grating pattern by an amount which varies with distance from the center of said hologram thereby generating a strip-multiplexed hologram which may be viewed flat without substantial distortion when illuminated with a point illumination source.

14. A system for synthesizing strip-multiplexed transmission holograms, comprising:
image projection means for sequentially generating a plurality of two-dimensional images of substantially non-diffuse light;
anamorphic projection means for compressing said images in a first direction and expanding said images in a second direction to form an elongated object beam, said second direction being orthogonal to said first direction, said anamorphic projection means being positioned directly beyond said image projection means before said object beam has significantly diverged;

an elongated diffraction grating placed in the path of said elongated object beam, said diffraction grating having a pattern corresponding to the interference pattern between a coherent, substantially nondiffuse reference beam and a coherent, substantially nondiffuse, cylindrical object beam; and holographic recording medium transport means positioned directly beyond said diffraction grating for sequentially advancing a holographic recording medium in a predetermined direction by a predetermined increment for each two-dimensional image generated by image projection means such that a strip hologram is recorded on said recording medium for each of said two-dimensional images to form a strip-multiplexed hologram.

15. The system of claim 14, wherein said image projection means comprise a cinema film projector system including cinema film transport means for sequentially advancing a strip of cinema film in single frame increments past a fixed projection aperture, and illumination means for projecting a beam of substantially nondiffuse light through said projection aperture thereby projecting a beam of substantially non-diffuse light modulated by the images on said cinema film onto said anamorphic projection means.

16. The system of claim 14, wherein said image projection means comprise:

a video projector kinescope including electron gun means directing electrons to the face of said video projection kinescope in accordance with a video signal; and means for generating a beam of substantially nondiffuse light and projecting it onto the face of said video projection kinescope such that said face modulates the substantially nondiffuse light in accordance with the electron pattern on said face corresponding to said video signal.

17. The system of claim 14, wherein said image projection means comprise:

an image convertor including means for focusing a sequence of images onto the input face of said image convertor; and means for generating a beam of substantially nondiffuse light and directing it onto said image convertor such that said convertor spatially modulates said beam of light in accordance with said images focused onto the input face of said convertor.

18. The system of claim 14, wherein said anamorphic projection means comprise a cylindrical lens placed directly in front of said projection means with the axis of said cylindrical lens extending along said second direction, said anamorphic projection means further including a spherical lens placed beyond the focal length of said cylindrical lens thereby causing said images to diverge along said second direction without diverging substantially along said first direction.

19. The system of claim 14, wherein said anamorphic projection means comprise a cylindrical lens positioned beyond said image projection means, said cylindrical lens having its axis extending along said first direction whereby said image diverges along said second direction without diverging substantially along said first direction.

20. The system of claim 14, wherein said anamorphic projection means comprise a spherical lens followed by a cylindrical lens having its axis extending along said first direction thereby causing said image to diverge in said second direction without diverging substantially along said first direction.

21. The system of claim 14, further including means for synthesizing holograms viewable flat without significant distortion using a point light source comprising a plurality of diffraction gratings mounted on transport means for sequentially placing each of said diffraction gratings in front of said elongated object beam, each of said diffraction gratings corresponding to the interference pattern between an unmodulated object beam and a reference beam having a different angle of incidence such that the diffraction grating thereby contact printed onto said holographic recording medium for each hologram strip corresponds to the angle at which light from said point light source strikes each strip hologram when said hologram is displayed flat.

22. The system of claim 14, including means for synthesizing holograms viewable flat without significant distortion using a point light source comprising means for laterally displacing the image modulation for each of said strip holograms relative to its phase modulation such that the image modulation is displaced in the direction of the center of the strip-multiplexed hologram with respect to its grating pattern by an amount which varies with distance from the center of said hologram thereby generating a strip-multiplexed hologram which may be viewed flat without substantial distortion when illuminated with a point illumination source.

23. The system of claim 14, further including means for synthesizing multicolor holograms comprising a plurality of holographic gratings, each having a grating pattern corresponding to the interference between an unmodulated object beam of a specific color and a reference beam of the same specific color such that the specific color for each of the plurality of gratings is different, and means for positioning a predetermined grating in the path of said elongated object beam for each exposure.

24. A system for synthesizing strip-multiplexed reflection holograms, comprising:

image projection means for sequentially generating a plurality of two-dimensional images in coherent light;

anamorphic projection means for compressing said images in a first direction and expanding said images in a second direction to form an elongated object beam, said second direction being orthogonal to said first direction, said anamorphic projection means being positioned directly beyond said image projection means before said object beam has significantly diverged;

holographic recording medium transport means spaced apart from said anamorphic projection means for sequentially advancing a holographic recording medium past said object beam in a predetermined direction by a predetermined increment for each two-dimensional image generated by said image projection means; and reference beam generator means for projecting an elongated beam of coherent light onto the opposite surface of said holographic recording medium than said object beam is incident on, said beams being directly opposite each other such that a strip reflection hologram is recorded on said recording medium for each of said two-dimensional images to form a strip-multiplexed reflection hologram.

25. The system of claim 24, wherein said image projection means comprise a cinema film projector system including cinema film transport means for sequentially advancing a strip of cinema film in single frame increments past a fixed projection aperture, and illumination means for projecting a beam of coherent light through said projection aperture thereby projecting a beam of coherent light modulated by the images on said film onto said anamorphic projection system.

26. The system of claim 24, wherein said image projection means comprise:
 a video projector kinescope including electron gun means directing electrons to the face of said video projection kinescope in accordance with a video signal; and
 means for generating a beam of coherent light and projecting it onto the face of said video projection kinescope such that said face modulates the coherent light in accordance with the electron pattern on said face corresponding to said video signal.

27. The system of claim 24, wherein said image projection means comprise:
 an incoherent-to-coherent image convertor including means for focusing a sequence of images onto the input face of said incoherent-to-coherent image convertor; and
 means for generating a beam of coherent light and directing it onto said incoherent-to-coherent image convertor such that said convertor spatially modulates said beam of light in accordance with said images focused onto the input face of said convertor.

28. The system of claim 24, wherein said anamorphic projection means comprise a cylindrical lens placed directly beyond said image projection means with the axis of said cylindrical lens extending along said second direction, said anamorphic projection means further including a spherical lens placed beyond the focal length of said cylindrical lens thereby causing said object beam to diverge along said second direction without diverging substantially along said first direction.

29. The system of claim 24, wherein said anamorphic projection means comprise a cylindrical lens positioned beyond said image projection means, said cylindrical lens having its axis extending along said first direction whereby said object beam diverges along said second direction without diverging substantially along said first direction.

30. The system of claim 24, wherein said anamorphic projection means comprise a spherical lens followed by a cylindrical lens having its axis extending along said first direction thereby diverging said object beam in said second direction without substantially diverging said object beam along said first direction.

31. The system of claim 24, further including means for synthesizing holograms viewable flat without significant distortion using a point light source comprising reference beam control means for adjusting the angle of incidence of said reference beam on said holographic recording medium as each image is recorded on said holographic recording medium such that the angle of incidence of said reference beam on said recording medium for each strip hologram corresponds to the angle at which said point light source strikes each strip hologram when said hologram is displayed flat.

32. The system of claim 24, further including means for increasing the vertical viewing angle of said reflection holograms comprising a unilateral diffusing screen placed between the anamorphic projection means and the holographic recording medium such that the object beam is diffused in the direction parallel to the longitudinal axis of the elongated object beam, thereby forming a strip-multiplexed reflection hologram viewable over an extended range of vertical angles.

33. The system of claim 24, wherein said image projection means projects coherent, multicolor images, and wherein said reference beam generator means projects a coherent, multicolor reference beam, and wherein said image projection means and said reference beam generator means project the same set of colors, and wherein the corresponding color components in the two means are mutually coherent, thereby synthesizing multicolor strip-multiplexed reflection holograms.

34. A system for synthesizing strip-multiplexed reflection holograms, comprising:
 image projection means for sequentially generating a plurality of two-dimensional images of substantially nondiffuse light;
 anamorphic projection means for compressing said images in a first direction and expanding said images in a second direction to form an elongated object beam, said second direction being orthogonal to said first direction, said anamorphic projection means being positioned directly beyond said image projection means before said object beam has significantly diverged;
 holographic recording medium transport means spaced apart from said anamorphic protection means for sequentially advancing a holographic recording medium past said object beam in a predetermined direction by a predetermined increment for each two-dimensional image generated by said image projection means, said holographic recording medium transport means having a reflecting and transforming means positioned on the opposite side of said recording medium from said anamorphic projection means; and
 means for reflecting said elongated object beam after it emerges from the opposite side of the holographic recording medium, and transforming said elongated object beam into another wavefront having a shape and direction such that the interference between the reflected, transformed wavefront and the object beam forms a strip reflection hologram in the holographic recording medium, and such that a sequence of such strip holograms recorded adjacently forms a strip-multiplexed reflection hologram.

35. The system of claim 34, wherein said image projection means comprise:
 a video projection kinescope including electron gun means directing electrons to the face of said video projection kinescope in accordance with a video signal; and
 means for generating a beam of substantially nondiffuse light and projecting it onto the face of said video projection kinescope such that said face modulates the subtantially nondiffuse light in accordance with the electron pattern on said face corresponding to said video signal.

36. The system of claim 34, wherein said image projection means comprise:
 an image convertor including means for focusing a sequence of images onto the input face of said image convertor; and
 means for generating a beam of substantially nondiffuse light and directing it onto said image convertor such that said convertor spatially modulates said beam of light in accordance with said images focused onto the input face of said convertor.

37. The system of claim 34, wherein said anamorphic projection means comprise a cylindrical lens placed directly beyond said image projection means with the axis of said cylindrical lens extending along said second direction, said anamorphic projection means further including a spherical lens placed beyond the focal length of said cylindrical lens thereby causing said object beam to diverge along said second direction without diverging along said first direction.

38. The system of claim 34, wherein said anamorphic projection means comprise a cylindrical lens positioned beyond said image projection means, said cylindrical lens having its axis extending along said first direction whereby said object beam diverges along said second direction without diverging substantially along said first direction.

39. The system of claim 34, wherein said anamorphic projection means comprise a spherical lens followed by a cylindrical lens having its axis extending along said first direction thereby diverging said object beam in said second direction without substantially diverging said beam along said first direction.

40. The system of claim 34, further including means for synthesizing holograms viewable flat without significant distortion using a point light source comprising a plurality of reflecting and transforming means mounted on transport means for sequentially advancing each of said reflecting and transforming means, each of said reflecting and transforming means producing a reflected and transformed wavefront corresponding to a reference beam having a different angle of incidence such that the interference pattern recorded in said holographic recording medium for each strip hologram corresponds to the angle at which said point light source strikes ecah strip hologram when said hologram is displayed flat.

41. The system of claim 34, further including means for synthesizing multicolor holgorams comprising a multicolor coded reference beam holographic grating having an interference pattern corresponding to a plurality of reference beams of coherent, nondiffuse light of differing colors.

42. The system of claim 34, further including a plurality of said means for reflecting and transforming said elongated object beam mounted on transport means for sequentially placing each of said reflecting means on the opposite side of said recording medium from said anamorphic projection means as the images are sequentially recorded, each of said reflecting means configured such that the reflected and transformed wavefront travels in a direction corresponding to the angle at which light from a point illumination source strikes each strip hologram when said strip-multiplexed hologram is displayed flat, so that the resulting strip-multiplexed holgram may be displayed flat without distortion when illuminated with a point light source.

43. The system of claim 34, further including means for synthesizing holograms viewable flat without significant distortion using a point light source comprising means for displacing the reflective means relative to the elongated object beam by an amount which varies with distance from the center of the strip-multiplexed hologram so that said reflected and transformed beam travels in a direction corresponding to the angle at which light from a point illumination source strikes each strip-multiplexed hologram when said strip-multiplexed ho-logram is displayed flat, so that the resulting strip-multiplexed hologram may be displayed flat without distortion when illuminated with a point light source.

44. The system of claim 34, further including means for synthesizing holograms with an extended vertical viewing angle comprising:
  a unilateral diffusing screen placed between the elongated cylindrical lens and the holographic recording medium such that the object beam is diffused in the direction parallel to the longitudinal axis of the elongated object beam; and
  reflecting means to transform the diffuse object beam into a substantially nondiffuse beam such that the interference between the reflected wavefront and the diffused object beam forms a strip hologram in the recording medium, such reflecting means comprising a reflective hologram formed by the interference between a longitudinally diffuse cylindrical wave and a nondiffuse reference beam, such that the reflected and transformed beam is a reconstruction of the nondiffuse reference beam.

45. The system of claim 34, further including means for synthesizing multicolor holgrams, comprising:
  projection means utilizing a multicolor source of nondiffuse light; and
  reflecting and transforming means such that all color components of the object beam are reflected and transformed into the same predetermined shape and direction, so that all color components of the object beam are simultaneously recorded as superimposed strip holograms, thereby forming multicolor strip holograms.

46. A method of synthesizing holograms, comprising:
  providing a multiplexed hologram composed of a sequence of individual holograms, each representing a particular view of an object from a particular point away from said object;
  reconstrucing a real image of said object by reconstruction of said multiplexed hologram with coherent light; and
  recording a second hologram at a position within said reconstructed real image such that the object beam for said second hologram includes said coherent light reconstruction of the real image of said first multiplexed hologram, and such that said second hologram includes object information corresponding to a sequence of views of said object along a line in the vicinity of said object.

47. A method of synthesizing image plane holograms, comprising:
  providing a first hologram synthesized in a surface-relief holographic medium;
  mounting said hologram on the inside of a cylindrical surface;
  providing a holographic recording medium adjacent said first hologram with said holographic recording medium passing approximately through the center of curvature of said cylindrical surface;
  directing a beam of coherent light toward a beamsplitter, thereby creating first and second beams of coherent light;
  illuminating said first hologram with said first beam, thereby creating a real image on a plane occupied by said holographic recording medium; and
  illuminating said holographic recording medium with said second beam, thereby recording a second hologram in which the image recorded on said first hologram appears to be intersected by the surface of said holographic recording medium such that the image appears to extend both before and beyond said recording medium.

48. The method of claim 47 wherein said first hologram is a multiplexed hologram.

49. The method of claim 47 wherein the relief surface of said first hologram is metallized to enhance reflectivity.

50. The method of claim 47 wherein said first beam reconstructs said real image by reflection from said first hologram.

51. The method of claim 47 wherein said second hologram is recorded on a flat detector intersecting said real image.

52. A method of synthesizing strip-multiplexed holograms, comprising:
  generating a sequence of images representing views from a series of perspectives along a line in the vicinity of the object; and
  recording the images as a series of laterally spaced strip holograms in a holographic recording medium in order to form a strip-multiplexed hologram whose surface corresponds to the locus of the views represented by the sequence of images.

53. The method of claim 52, wherein the sequence of images is generated by means of recording the images of the object as reflected in a concave cylindrical mirror which is relatively large compared to the object.

54. The method of claim 52, wherein the sequence of images is generated by means of recording the images of the object as reflected in a concave ellipsoidal mirror which is relatively large compared to the object.

55. The method of claim 52, wherein the sequence of images is generated by means of recording the images of the object as reflected in an anamorphic Fresnel reflector which is relatively large compared to the object.

56. The method of claim 52, wherein the sequence of images is generated by means of recording the images of the object as transformed by an anamorphic Fresnel lens which is relatively large compared to the object.

57. The method of claim 52, wherein the sequence of images is generated by means of recording the images of the object as transformed by a cylindrical lens which is relatively large compared to the object.

58. The method of claim 52, wherein the sequence of images is generated by the procedure:
  recording a first sequence of images of an object by conventional means from a sequence of points along a line relatively distant from the object; and
  generating a second sequence of images from the first sequence by the process of composing each of said second sequence of images from vertical strips of the images in said first sequence such that said second sequence represents a series of views from perspectives along a second line in the vicinity of the object.

59. A method of synthesizing a hologram, comprising:
  providing a multiplexed hologram composed from a sequence of holographic recordings of different views of an oibject scene, said recordings being substantially nonoverlapping and and substantially contiguous, and said recordings further being arranged and configured such that upon illumination with a reconstruction beam, said multiplexed hologram generates a predetermined real image;
  illuminating said multiplexed hologram with a reconstruction beam and thereby generating said predetermined real image; and
  recording as a second hologram the interference between light forming said real image and light in a reference beam.

60. A method of making a hologram, comprising:
  providing a cylindrical multiplexed hologram composed from a sequence of holographic recordings of different views of an object scene, said recordings being substantially nonoverlapping and substantially contiguous, and said recordings being further arranged and configured such that upon illumination with a reconstruction beam, said multiplexed hologram generates a predetermined real image;
  illuminating said multiplexed hologram with a reconstruction beam and thereby generating said predetermined real image; and
  recording as a second hologram the interference between light forming said real image and light in a reference beam.

* * * * *